Nov. 28, 1950

T. H. THOMAS 2,531,710

CLUTCH CONTROL MECHANISM

Filed Nov. 4, 1944

INVENTOR.
THOMAS H. THOMAS
BY
H. O. Clayton
ATTORNEY

Nov. 28, 1950

T. H. THOMAS 2,531,710

CLUTCH CONTROL MECHANISM

Filed Nov. 4, 1944

INVENTOR.
THOMAS H. THOMAS
BY
ATTORNEY

Nov. 28, 1950        T. H. THOMAS        2,531,710
CLUTCH CONTROL MECHANISM
Filed Nov. 4, 1944        3 Sheets-Sheet 3
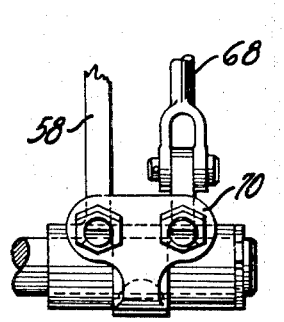
FIG. 3
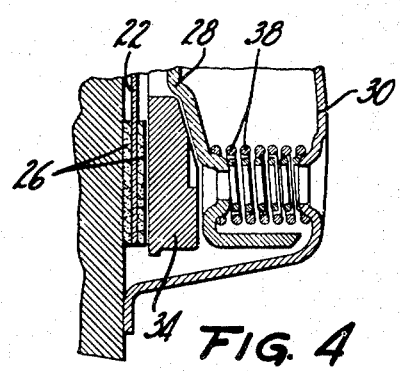
FIG. 4
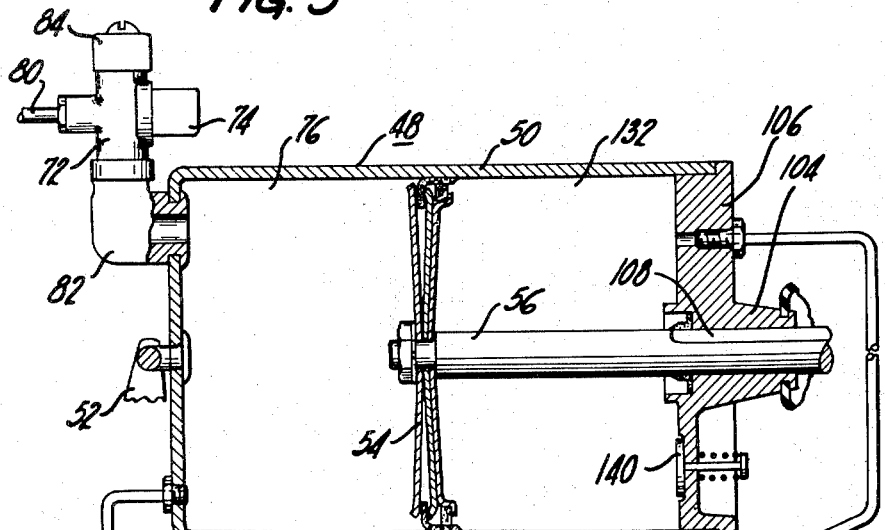
FIG. 5
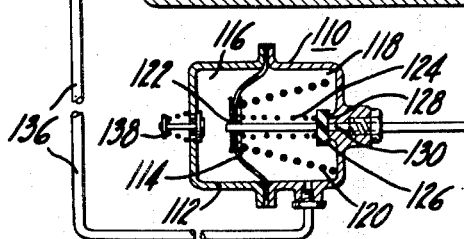
INVENTOR.
THOMAS H. THOMAS
BY
ATTORNEY Patented Nov. 28, 1950

2,531,710

UNITED STATES PATENT OFFICE 2,531,710

CLUTCH CONTROL MECHANISM

Thomas H. Thomas, South Bend, Ind., assignor to Bendix Aviation Corporation, South Bend, Ind., a corporation of Delaware Application November 4, 1944, Serial No. 561,844

1 Claim. (Cl. 192—91)

This invention relates in general to the clutch mechanism of an automotive vehicle and in particular to power means for controlling the operation thereof.

More specifically, the invention relates to a pressure differential operated power means for controlling the operation of a combined centrifugal and spring operated clutch. To this end there is suggested a manifold vacuum operated motor operably connected to the spring operated pressure plate of the clutch, said plate having mounted thereon centrifugally operated means supplemented by the operation of the clutch springs in effecting the desired smooth engagement of the clutch.

A further feature of the invention relates to the provision of power means for controlling the operation of the aforementioned combined centrifugal and spring operated clutch, said means being controlled in part by the means for operating the engine throttle of the vehicle: apropos the latter feature of the invention it is an object to so correlate the opening of the throttle and the clutch engaging operation of the power means as to insure an effective operation of the centrifugal means in engaging the clutch.

A further object of the invention is to provide a pressure differential operated motor operable, in controlling the clutch engaging operation of a combined centrifugal and spring operated clutch mechanism, to effect two distinct stages of movement of the pressure plate, the first stage being relatively rapid and terminating when the driving and driven clutch elements are to a slight degree loaded by the spring means of the clutch, and the latter stage being relatively slow to effect, under unusual driving conditions, an operation of the clutch springs to supplement the clutch engaging action of the centrifugally operated weights.

Yet another object of the invention is to so construct and arrange the parts of the aforementioned mechanism as to correlate the timing of the operation of the centrifugal mechanism with respect to the timing of the operation of the clutch springs to the end that under ordinary driving conditions the clutch will be engaged by the action of the centrifugal mechanism and to a degree by the clutch springs, the clutch springs, after a certain timed delay further supplementing the centrifugal mechanism in completing the engagement of the clutch. This mechanism therefore obviates a slipping clutch when the engine is temporarily subject to a heavy torque for example when the car is heavily loaded or is going up an incline.

Yet another object of my invention is to provide power means for quickly and completely disengaging a combined centrifugal and spring operated friction clutch; for with a conventional type of centrifugal clutch the disengagement thereof is delayed, resulting in a slipping of the clutch and an undesired deceleration of the vehicle, when the accelerator is released and the car is travelling at a relatively high speed. With my invention, however, that is the combination of centrifugally operated means and spring operating power means for effecting the disengagement and controlling the engagement of the clutch plates, there is a complete separation of said plates immediately after control means, for example the accelerator and either a governor or transmission controlling shift lever, is operated to effect a clutch disengaging operation of the power means.

One of the most important objects of my invention is to provide power means for controlling the operation of a combined centrifugal and spring operated friction clutch said power means including a two-stage pressure differential operated motor for controlling the clutch engaging operation of the spring means of the clutch said motor being controlled by a three-way valve and by power operated valvular means for controlling the two stages of clutch engaging operation of said motor, the latter means being controlled in part by the three-way valve and being operative to effect said second stage operation of the motor after a certain timed delay.

In general therefore it is the object of the invention to provide an automatically operable friction clutch structure operative to accurately simulate a skillful manual operation of said clutch to the end that the vehicle may be effectively accelerated under all conditions of service.

Other objects of the invention and desirable details of construction and combinations of parts will be apparent from the following description of a preferred embodiment of the invention, taken in conjunction with the accompanying drawings, in which:

Figure 3 is a fragmentary view disclosing a portion of the connection interconnecting the clutch, the clutch motor and the clutch pedal;

Figure 4 is an enlarged fragmentary and sectional view of a portion of the clutch structure of Figure 2 disclosing the clutch engaging springs;

Figure 5 is a diagrammatic view, largely in section disclosing the relative position of the parts of the mechanism when the clutch plates are slightly loaded by the clutch springs of the mechanism and just prior to the clutch engaging operation of the centrifugal weights of said mechanism.

Figure 1:
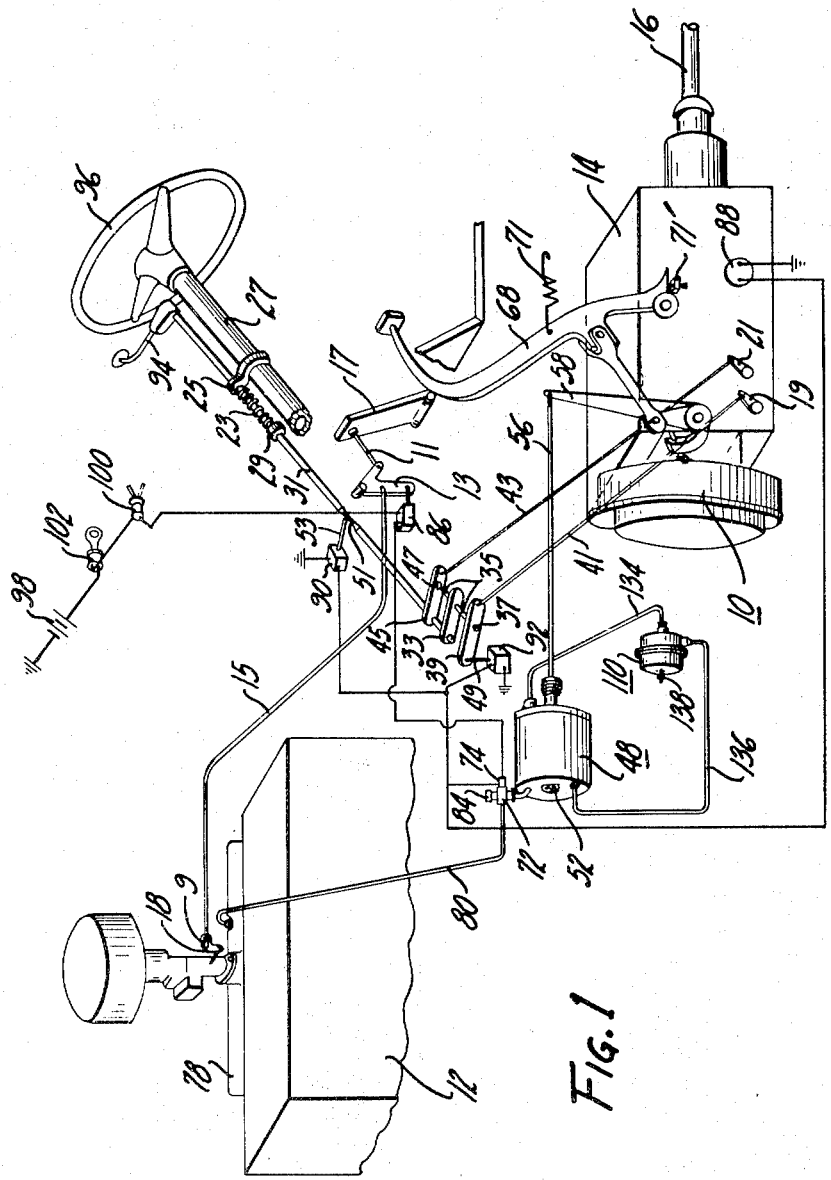
Figure 1 is a diagrammatic view of the clutch operating mechanism constituting the present invention.

In that embodiment of the invention selected for illustration there is diagrammatically disclosed in Figure 1 a clutch mechanism 10 which is adapted to interconnect the internal combustion engine 12 of an automotive vehicle with a conventional change-speed transmission 14, the latter being drivably connected by a propeller shaft 16 with the driving wheels of the vehicle. The accelerator 17 of the vehicle is connected to a throttle operating crank 18 by means of a link 11, a lever 13, and a link 15, the latter being provided with a pin at its end fitting with a slotted portion 9 of the throttle operating crank 18 to provide a lost motion connection.

Figure 2:
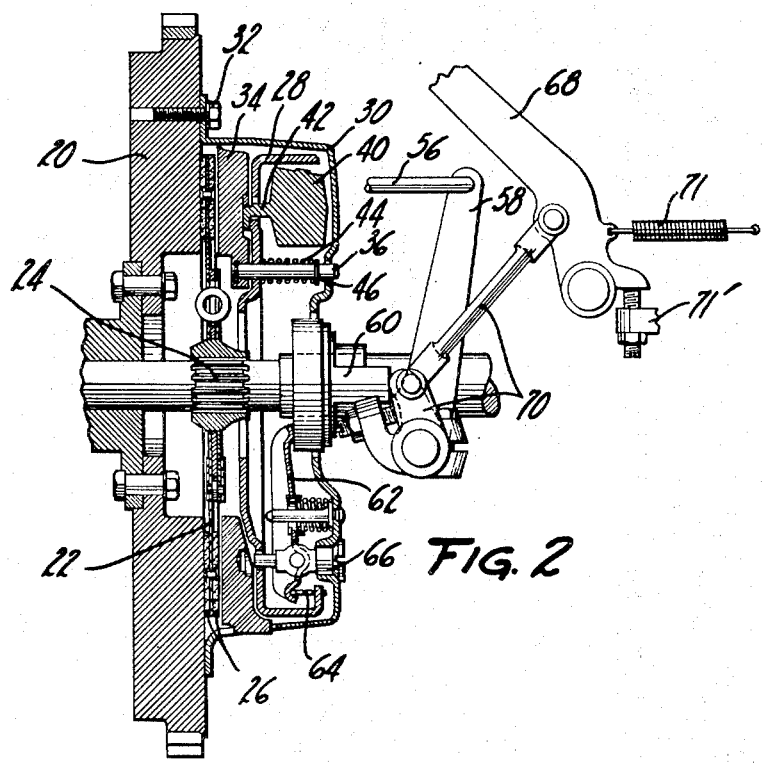
Figure 2 is a sectional view disclosing in detail the structure of the combined centrifugal and spring operated clutch to be controlled.

My invention is directed to power means for controlling the operation of the clutch 10, the latter being of a combined centrifugal and spring operated type. As disclosed in Figure 2, a flywheel 20, drivably connected with the engine 12, constitutes the driving element of the clutch; and a disk 22, slidably keyed to the propeller shaft 16 at 24 and provided with friction rings 26 constitutes the driven clutch element. The means for forcing the driven clutch element into driving engagement with the driving clutch element comprises a pressure plate 28, mounted within a clutch shaped housing 30 secured to the flywheel plate by fastenings 32. A ring 34, mounted on the plate by a plurality of pins 36, constitutes, together with the plate, a pressure applying unit, said unit being normally urged to the left, to engage the clutch, by means of a plurality of angularly spaced clutch springs 38, Figure 4.

A plurality of angularly spaced centrifugally operated weight members 40 each having a lever-like shank portion 42 extending through the plate 38 into engagement with the ring 34, are supplemented by the clutch engaging action of the springs 38 at or above a predetermined R. P. M. of the flywheel, the centrifugal force developed by the rotating weights serving to urge the weights outwardly in direct proportion to the angular speed of the flywheel and tending to force the ring from the plate and into engagement with the driven clutch element 26. Above the predetermined R. P. M. of the flywheel the clutch engaging springs 38 serve to supplement the clutch engaging operation of the weights 40. Springs 44 sleeved over the pins 36 between the plate 28 and stops 46, serve as return springs to keep the plate and ring together when the flywheel is static or below the aforementioned critical angular speed. The loading of the clutch is thus the additive result of the effects of the clutch springs 38 having a constant maximum effect and the centrifugally operated weights 40, the effect of the latter being a variable the value of which is a function of the R. P. M. of the flywheel.

The invention is specifically directed to power operated means for controlling both the disengagement and engagement of the aforementioned clutch, and in such fashion as to result in its most effective operation under various conditions of service of the vehicle. The above described specific clutch structure is not claimed herein.

To the above end there is provided a fluid pressure operated motor preferably a double-ended manifold vacuum operated motor 48 comprising a cylinder 50, pivotally secured to the chassis of the vehicle at 52, and a reciprocable piston element 54, the latter being operably connected to the pressure plate 28 of the pressure unit by a rod 56, crank 58, slidable collar 60, lever operating finger members 62 and pins 64. The finger members 62 are fulcrumed intermediate their ends upon pins 66, secured to the housing member 30. The pressure plate may also be operated to disengage the clutch by means of a conventional clutch pedal 68 interconnected with the sleeve 60 by linkage 70. A spring 71 serves to maintain the pedal 68 in its off position against a stop 71'.

One of the most important features of my invention resides in the valvular mechanism for controlling the operation of the aforementioned clutch operating motor. To this end there is provided a three-way valve 72 of conventional design and therefore not disclosed in detail, said valve being operated by a solenoid 74 to open the valve, that is, connect a compartment 76 of the motor 48 with the intake manifold 78 of the engine 12 via a conduit 80, valve 72, and a fitting 82, Figure 5. The three-way valve is also, of course, operated by a spring, not shown, to close the valve, that is, vent the compartment 76 to the atmosphere via an air cleaner 84, the valve 72 and the fitting 82.

The solenoid 74 is preferably controlled by an accelerator operated switch 86, a grounded vehicle speed responsive governor operated switch 88 and grounded switches 90 and 92 actuated by a transmission and clutch controlling shift lever 94 conveniently mounted beneath the steering wheel 96 of the vehicle. As disclosed in Figure 1 the grounded governor operated switch 88 is wired in series with the solenoid 74 and the accelerator operated switch 86, the latter switch being wired to a grounded battery 98. A cut out switch 100 and the ignition switch 102 of the ignition system of the vehicle are interposed in series in the wiring interconnecting the battery and accelerator operated switch.

Describing now the shift lever operated mechanism for operating the switches 90 and 92, the shift lever 94 is preferably connected with said switches and shift rail actuating cranks 19 and 21 by the force transmitting links and levers disclosed in Figure 1. Describing the operation of this force transmitting means and the parts thereof, a spring 23 interposed between a stop 25 fixedly secured to the steering post 27 of the vehicle and a stop 29 fixedly secured to a shaft 31 serves to bias said rod downwardly to the position disclosed in Figure 1. Now to the lower end of the rod 31 there is fixedly secured a crank 33 through which extends a pin 35; and when said rod is moved downwardly by the spring 23 one end of said pin extends within an opening 37 in a floating crank 39. To one end of the crank 39 there is pivotally connected a rod 41, said rod being pivotally connected at its other end to the end of the crank 19. This crank when rotated clockwise serves to actuate other force transmitting means within the casing of the three speeds forward and reverse transmission 14 to establish the transmission in its high gear setting; when said crank is rotated counter-clockwise the transmission is established in its second gear setting.

The crank 21 when rotated clockwise serves to establish the transmission in its low gear setting and when rotated counter-clockwise serves to establish the transmission in reverse gear. The connection between the crank 21 and the shift lever 94 includes a link 43 pivotally connected to a crank 45, said crank at one of its ends being rotatably mounted on the shaft 31 which is bodily movable through said crank. This crank is provided with an opening 47 to receive one end of the pin 35.

When the driver wishes to establish the transmission in its high gear setting he rotates the shift lever 94 counter-clockwise and this operation serves to rotate the floating crank 39. Now the switch 92 is preferably so constructed that the force necessary to close the same, that is the force necessary to compress a spring within the switch connected to its movable contact, is less than the force necessary to effect the initial movement of the high second shift rail. It follows therefore that the initial high gear movement of the shift lever 94 results in a pivoting of the crank 39 about its connection with the rod 41; and this operation results in a closing of the clutch controlling switch 92. Continued movement of the shift lever, that is the movement after the switch 92 is closed and there is no possible further movement of a link 49 interconnecting the crank 39 with said switch, results in a pivoting of said crank about its pivotal connection with the link 49; and this operation results in the operation of the transmission to establish the same in its high gear setting. After this setting is established the driver removes his hand from the shift lever whereupon the aforementioned spring within the switch 92 operates to open said switch. This switch is so constructed that the same is also closed when the driver moves the shift lever 94 to establish the transmission in its second gear setting; and the spring means within said switch also functions to open the same when the second gear setting of the transmission has been established and the driver removes his hand from the shift lever.

Describing the operation of the switch mechanism to establish the transmission in either reverse gear or low gear the driver first rotates the shift lever 94 upwardly in a plane perpendicular to the plane of the steering wheel 96; and this operation serves to bodily move the shaft 31 upwardly against the tension of the spring 23. The upper end of the pin 35 is by this operation moved into the opening 47 and a subsequent rotation of the shift lever, either to establish the transmission in reverse or low gear, results in a rotation of the cranks 45 and 21 to effect one or the other of these settings of the transmission. The shaft 31 is provided with a recessed portion 51 which receives a pin 53 operably connected to the grounded switch 90; and as will be obvious from an inspection of Figure 1 when the shaft 31 is moved upwardly, in the operation of establishing the transmission in either reverse or low gear, the switch 90 is closed by virtue of the forcing of the pin 53 to the left, Figure 1, when the end of said pin is forced out of the recess 51 and onto the full bodied portion of the shaft.

There is thus provided, by the above described shift lever operated switch operating mechanism, means, cooperating with the accelerator operated switch 86, for effecting a clutch disengaging operation of the motor 48 during the first increment of movement of the shift lever as it is moved to establish the transmission in any one of its four gear settings. The parts of the mechanism are preferably so constructed and arranged that the clutch is disengaged before the transmission is operated. It is to be noted that the switch operating force transmitting means of my invention is such as to effect a closing of the switch mechanism when the shift lever is moved in either one of two different planes. The clutch control mechanism of my invention may be incorporated in the power plant of a vehicle which includes a kickdown type of selective gear transmission of the day, that is a transmission which may, by a manual operation of a shift lever, be established in any one of a plurality of forward gear settings or a reverse gear setting; and after a forward gear setting is established then a vacuum and spring operated kickdown motor unit, controlled by a vehicle speed responsive governor and the accelerator of the vehicle, takes over the operation of said transmission. In this type of well known transmission mechanism incorporated on cars now in operation, the kickdown on downshift operation of the motor unit is facilitated by a momentary disabling of the ignition system of the engine; and the power plant including such a mechanism may also include a fluid coupling.

Referring now to Figure 5 disclosing the motor 48 and valvular means for controlling said motor, there is provided power operated valvular means for effecting a two-stage clutch engaging operation of said motor. The first stage valve of said valvular means, which is power operated by the operation of the piston 54, comprises a hub portion 104 of an end plate 106 of the motor which hub portion cooperates with a slot 108 in the connecting rod 56 interconnecting the piston 54 with the clutch operating crank 58. A second stage valve and power means for operating the same includes a pressure differential and spring operated motor 110 comprising a two-part casing 112 and a power element 114. The motor therefore includes a chamber 116 and a chamber 118, the latter housing a spring 120 biasing the power element to the left, Figure 5. The power element is provided with a relatively small opening 122 in its central portion, the function of which is described hereinafter. Housed within the spring 120 there is provided another spring 124 which is interposed between one face of a relief valve member 126, that is the second stage valve, and one face of the power element 114. The valve member 126 is forced upon a seat 128, to close off a valve port 130, when the motor 110 is vacuum energized, that is, when the chamber 118 is partially evacuated. The port 130 is connected to a chamber 132 of the motor 48 by a conduit 134; and the chamber 118 of the motor 110 is connected to the chamber 76 of the motor 48 by a conduit 136.

There is thus provided power means for operating the second stage valve for when the motor 110 is vacuum energized, by an operation of the three-way valve 72 to effect the clutch disengaging operation of the motor 48, then the chamber 118 is partially evacuated resulting in a movement of the power element 114 to the right, Figure 5, to close the valve 126. This movement of the power element is effected as a result of a differential of pressures acting upon the same; for when the air is drawn out of the chamber 118 air is admitted to the chamber 116 via a check valve 138.

When the chamber 118 is vented to the atmosphere, as a result of the clutch engaging operation of the three-way valve 72, then the motor 110 is spring energized, the spring 120 serving to move the power element 114 to the left, Figure 5, and this operation makes possible an opening of the second stage relief valve 126. This opening of the latter valve and the remainder of the operation of the mechanism to effect a second stage operation of the clutch engaging operation of the motor 48 will be described in detail hereinafter.

Describing now the complete operation of the clutch controlling mechanism constituting my invention, with the accelerator released, the vehicle at a standstill and the engine dead, the governor operated and accelerator operated switches 88 and 86 are closed, accordingly, the solenoid 74 is energized to open the three-way valve 72. However, the gaseous pressure within the intake manifold is at this time equal to the pressure of the atmosphere, accordingly, the motor is not energized.

Now when the engine is started, the intake manifold is immediately partially evacuated by virtue of the pumping action of the engine pistons, accordingly, the compartment 76 of the motor 48 is also partially evacuated; and this results in a movement of the piston 54 to the left, Figure 5, to effect a movement of the pressure plate of the clutch away from the driven clutch plate. This movement of the piston is effected inasmuch as the same is then subjected to a differential of pressures, the compartment 132 of the motor being maintained at atmospheric pressure by virtue of the operation of a check valve 140 mounted in the end plate 106 of the motor.

The driver will then probably establish the transmission in its low gear setting by an operation of the shift lever 94 and after this operation is effected he will then depress the accelerator to effect an engagement of the clutch to get the car under way. Describing the clutch engaging operation of the motor 48, the first increment of movement of the accelerator serves to open the switch 86; and the construction and arrangement of the parts of the mechanism, particularly the construction of the lost motion connection 9, is such that said switch is opened before the throttle is opened. Now with the opening of the switch 86, the solenoid 74 is deenergized thereby permitting the spring within the valve 72 to close said valve, that is, effect a venting of the compartment 76 to the atmosphere; and when said compartment is vented to the atmosphere, this operation initiates a clutch engaging movement of the piston 54 under the action of the several clutch springs 38. The piston is then moved to the right, Figure 5, the air in the compartment 132 being pushed out of said compartment via the slot 108 in the connecting rod 56.

When the piston has moved a certain distance to the right the slot is covered by the hub portion 104, all as disclosed in Figure 5, whereupon the movement of the piston is arrested. Now the length of the slot 108 is so determined and the remainder of the parts of the mechanism are so constructed and arranged that this first stage operation of the valve means is completed when the pressure plate of the clutch has moved sufficiently to effect a slight loading of the driving and driven clutch plates; and this operation is effected before or at substantially the same instant that the opening movement of the throttle is initiated. It follows, therefore, that the clutch plates are to a degree loaded when the operation of the centrifugally operated weights 40 is initiated. If at this time the R. P. M. of the engine is not high enough to effect a clutch engaging operation of the centrifugal weights, then the clutch springs 38 serve, if the vehicle load is not too high, to insure a sufficient engagement of the clutch to effect a forward motion of the vehicle.

The driver, in his operation of the accelerator, usually does not arrest the throttle opening movement of said control means, accordingly, continued depression of the accelerator will serve to open the throttle to speed up the engine; and when the R. P. M. of the engine is above a critical factor, which is of course relatively low, then the centrifugal weights 40 function to load the ring 34 of the pressure plate unit to effect the engagement of the clutch.

Now, as previously described, when the three-way valve 72 is closed to vent the chamber 118 of the motor 110 to the atmosphere, the spring 120 immediately functions to make possible an opening of the valve 126. This opening of the valve is, however, delayed for a certain time, this delay being effected by virtue of the time required to equalize the gaseous pressures in the chambers 116 and 118; for after the completion of the first stage of clutch engaging operation of the motor 48, which operation is described above, then the clutch springs continue to act to force the piston 54 to the right, Figure 5, thereby pushing air out of the chamber 132 of said motor. This operation tends to unseat the relief valve 126 against the tension of the spring 124; however, this unseating operation is delayed until the load on said spring is sufficiently reduced by the aforementioned bypassing of air from the chamber 116 to the chamber 118. This bypassing is, of course, effected by virtue of the opening 122 in the power element 114.

It follows, therefore, that the time of opening of the valve 126 is determined by several factors including: the strength of the springs 120 and 124, the gaseous pressure within the chamber 118, the size of the port 130, the strength of the clutch springs 38, and other factors.

The parts of the mechanism are preferably so constructed and arranged and so operative that the opening of the second stage valve 126 to initiate the second stage operation of the motor 48 is delayed until after the throttle has been opened to a degree sufficient to effect all normal clutch engaging operations of the clutch; but after a relatively short time the clutch springs, by virtue of the second stage operation of the motor 48, further supplements the clutch engaging operation of the centrifugal weights 40, thereby insuring a loading of the clutch plates that will prevent the clutch from slipping under all conditions of service.

There is thus provided a clutch mechanism which insures a smooth start of the vehicle from rest, the clutch springs 38 supplementing the clutch engaging operation of the weights 40. If the vehicle is perchance heavily loaded, then the engine will probably be slowed down in getting the vehicle under way; and this so-called laboring of the engine results in a slipping clutch inasmuch as the weights 40 exert a clutch engaging force which is directly proportional to the speed of the engine. The clutch springs 38, however, come into action with the above described second stage operation of the motor 48 to supplement the operation of the weights thereby insuring sufficient loading of the clutch plates to prevent their slipping.

The vehicle being then under way, the driver will release the accelerator and then operate the shift lever 94 to establish the transmission in a higher gear ratio setting. As described above, the first increment of movement of the shift lever serves to close one or the other of the switches 90 or 92 depending of course upon the operation of said lever. The accelerator being at the time released to close the switch 86, it follows that the motor 48 is again energized to effect a disengagement of the clutch mechanism, all as previously described. After the operation of the transmission is completed, the driver removes his hand from the shift lever thereby opening one or the other of the switches 90 or 92 to thereby effect an operation of the three-way valve 72 and initiate the above described clutch engaging operation of the motor 48. Subsequent depression of the accelerator will then, as described above, effect the clutch engaging operation of the weights 40.

When the vehicle is slowed down below a certain speed, then the governor operated switch 88 is closed and, if the accelerator is at the time released to close the switch 86, then the motor 48 is again energized to effect a disengagement of the clutch mechanism.

There is thus provided means, including the clutch springs 38 and the motor 48 for operating the same, for supplementing the clutch engaging operation of the centrifugal weights 40 to insure the desired acceleration of the vehicle and prevent the clutch plate wearing effect of a slipping clutch when the engine is laboring. It is also to be noted that the motor 48 serves to insure a disengagement of the centrifugal clutch means, and thereby obviate any undesirable deceleration of the vehicle, when the accelerator is suddenly released when the vehicle is traveling at a relatively high speed.

While one illustrative embodiment has been described, it is not my intention to limit the scope of the invention to that particular embodiment, or otherwise than by the terms of the appended claim.

I claim:

In an automotive vehicle provided with a centrifugal and spring operated friction clutch, power means for controlling the operation of said clutch including a pressure differential operated motor having two control chambers therein, valvular means for controlling the operation of said motor comprising a three-way valve operable in part to effect the clutch disengaging operation of the motor, a first stage valve and a second stage valve, power means for controlling the operation of the second stage valve including a pressure differential operated motor which includes a double-ended casing and a power element having an opening in its center, a fluid transmitting conduit interconnecting one chamber of the latter motor with one chamber of the first mentioned motor and another fluid transmitting conduit interconnecting the aforementioned chamber of the second mentioned motor with the other chamber of the first mentioned motor.

THOMAS H. THOMAS.

REFERENCES CITED

The following references are of record in the file of this patent:

UNITED STATES PATENTS

| Number | Name | Date |
|---|---|---|
| Re. 20,794 | Hill et al. | July 12, 1938 |
| 2,043,786 | Tyler | June 9, 1936 |
| 2,049,737 | Hill et al. | Aug. 4, 1936 |
| 2,057,740 | Price et al. | Oct. 20, 1936 |
| 2,098,674 | Price et al. | Nov. 9, 1937 |
| 2,118,123 | Watts | May 24, 1938 |
| 2,168,682 | Paine | Aug. 8, 1939 |
| 2,175,235 | Whittington | Oct. 10, 1939 |
| 2,177,662 | Kliesrath et al. | Oct. 31, 1939 |
| 2,181,743 | Sanford | Nov. 28, 1939 |
| 2,184,616 | Hill | Dec. 26, 1939 |